United States Patent [19]

Janssen et al.

[11] 3,756,381
[45] Sept. 4, 1973

[54] BARN CLEANER PADDLE WIPER

[75] Inventors: Gail E. Janssen, Kaukauna; John L. Hoh, Appleton, both of Wis.

[73] Assignee: Badger Northland Inc., Kaukauna, Wis.

[22] Filed: Nov. 1, 1971

[21] Appl. No.: 194,759

[52] U.S. Cl. ............... 198/185, 198/205, 198/229
[51] Int. Cl. ...................... B65g 17/18, B65g 45/00
[58] Field of Search .................. 198/229, 230, 231, 198/205, 169, 185

[56] References Cited
UNITED STATES PATENTS

| | | | |
|---|---|---|---|
| 1,944,693 | 1/1934 | Bradford et al. | 198/169 X |
| 778,191 | 12/1904 | Hall | 198/229 X |
| 764,435 | 7/1904 | Donaldson et al. | 198/230 X |
| 1,292,997 | 2/1919 | Becker | 198/229 |
| 833,141 | 10/1906 | Van Nouhuys | 198/169 X |
| 1,609,849 | 12/1926 | Wagner | 198/229 |

Primary Examiner—Harvey C. Hornsby
Assistant Examiner—James W. Miller
Attorney—Gerhardt, Greenlee & Farris

[57] ABSTRACT

A paddle wiper mechanism for a barn cleaner in which the barn cleaner comprises a conveyor adapted to move refuse material from a ground surface outwardly and upwardly to a storage area at an elevated position. The barn cleaner conveyor and elevator is composed of an endless chain to which are connected a plurality of transverse bar members defining material moving paddles. Intermediate the ground position and the elevated discharge position of the barn cleaner elevator, a selectively openable drop chute is provided and a wiper mechanism is provided at the intermediate crop chute to be positioned in place across the stacking elevator and to be automatically rotated to wipe material from the transverse bar members of the elevator as they pass across the drop chute opening to thereby selectively drop material through the intermediate chute opening at a location intermediate the ground position and the elevated discharge position of the stacking elevator.

5 Claims, 6 Drawing Figures

INVENTORS.
GAIL E. JANSSEN
BY JOHN L. HOH

Gerhardt, Greenlee & Farris
ATTORNEYS.

INVENTORS
GAIL E. JANSSEN
BY JOHN L. HOH
ATTORNEYS

INVENTORS.
GAIL E. JANSSEN
BY JOHN L. HOH

Gerhardt, Greenlee & Farris
ATTORNEYS.

3,756,381

BARN CLEANER PADDLE WIPER

BACKGROUND AND SUMMARY OF THE INVENTION

Barn cleaners are known which are adapted to automatically remove and dispose of the manure of cattle and other animals kept in the barn and which usually comprise a conveyor chain or similar conveying means traveling at a relatively slow speed along the gutter of the barn. A plurality of scraping paddles defined by transverse cross bars are attached to the conveyor chain at spaced distances to scrape the manure from one end of the barn to a conveyor pick-up at the other end of the barn where a stacking elevator is provided and adapted to continuously move the refuse upwardly to an elevator drop-off position for disposal in a manure stacking station.

The stacking elevator usually comprises an endless chain to which are attached a plurality of bar members defining paddles which retain the manure and convey it upwardly to the drop-off. At the drop-off end, the stacking elevator is normally provided with automatically operated wiping means which continuously act to wipe the manure from the paddles of the stacking elevator as it passes over the drop-off end.

In instances it will be convenient to directly deposit the manure or other refuse as it comes from the barn onto a spreader wagon or trailer for immediate field use or, for instance, when the stacking station becomes overloaded.

In order to accomplish this, an intermediate drop out section has to be provided intermediate the ground and the drop-off end of the stacking elevator for direct loading onto the spreader wagon. These conventional drop-outs usually comprise hand-operated chute slides which open to permit the manure or material conveyed by the stacking elevator to drop out and fall below onto the spreader wagon or the like.

Various difficulties have been encountered in effective and economical operation of the known drop-out chutes which frequently get jammed by material sticking onto the paddle members, or by material becoming lodged in a swiveling mechanism of the drop-out chute because of ineffective wiping off of the paddle members of the stacking elevator.

A further object of the present invention resides in the provision of an improved wiper mechanism for the drop-out chute of the stacking elevator which is provided with locking means to retain the pivotally supported wiper mechanism in place over the drop-chute opening.

Further objects and novel features of the present invention will become more fully apparent by reference to the following detailed description in connection with the appended drawings.

DETAILED DESCRIPTION OF THE INVENTION

Figure 1:
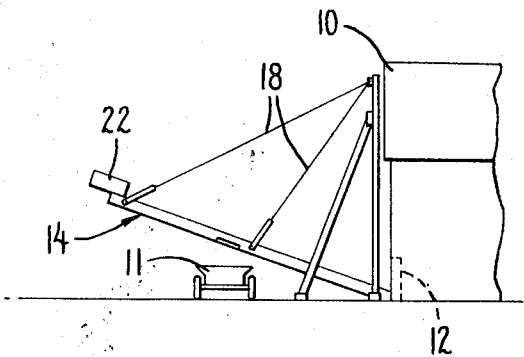
FIG. 1 is a schematic illustration of a refuse stacking elevator in which the present improved intermediate drop-out chute and paddle wiper mechanism may be employed.

With continuous reference to the drawings, FIG. 1 schematically illustrates a barn, pen or similar building 10 usually intended to be occupied by cattle or other animals. The building 10 has an opening 12 which communicates with the interior of the barn and simultaneously with an outwardly extending stacking elevator mechanism 14. It will be understood that a manure scraping conveyor means (not shown) of any conventional design is disposed in barn 10 to convey refuse material to the opening 12.

The stacking elevator 14 is of the conveyor type and comprises a longitudinal channel like trough housing 16 which is retained in an upwardly inclined position by means of braces, tie rods and the like 18.

Figure 2:
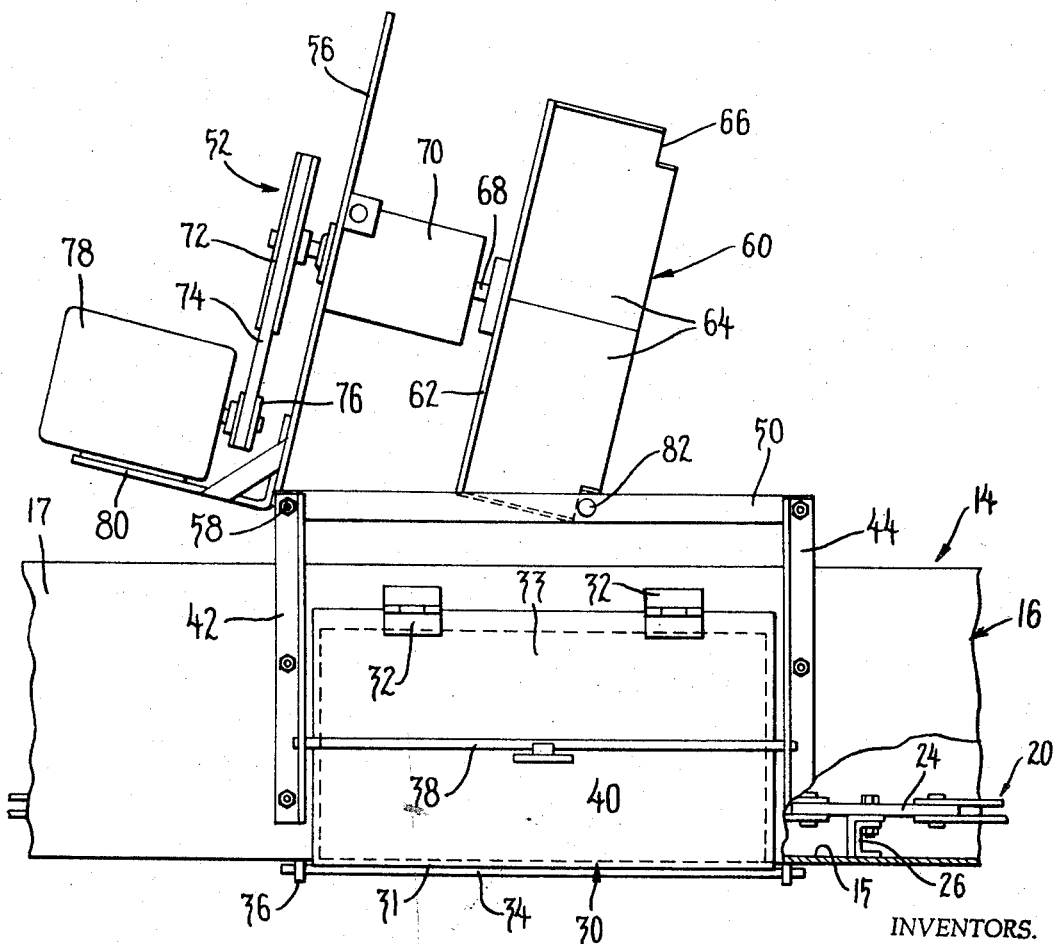
FIG. 2 is a fragmentary side elevation on an enlarged scale illustrating the present improved drop-out and wiper mechanism for a refuse stacking elevator more in detail and showing the mechanism in inactive position.
Figure 3:
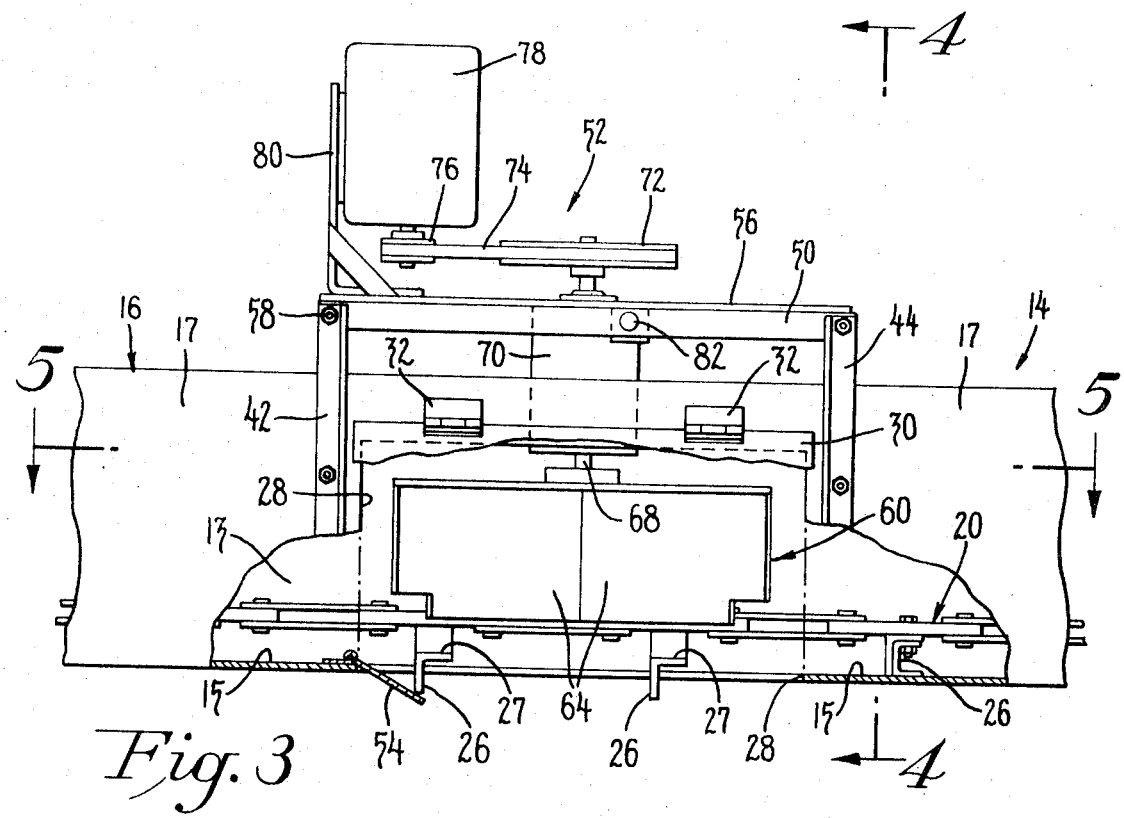
FIG. 3 is a fragmentary side elevation similar to FIG. 2 shown with the drop-out cover removed and illustrating the present improved mechanism in operating position.
Figure 4:
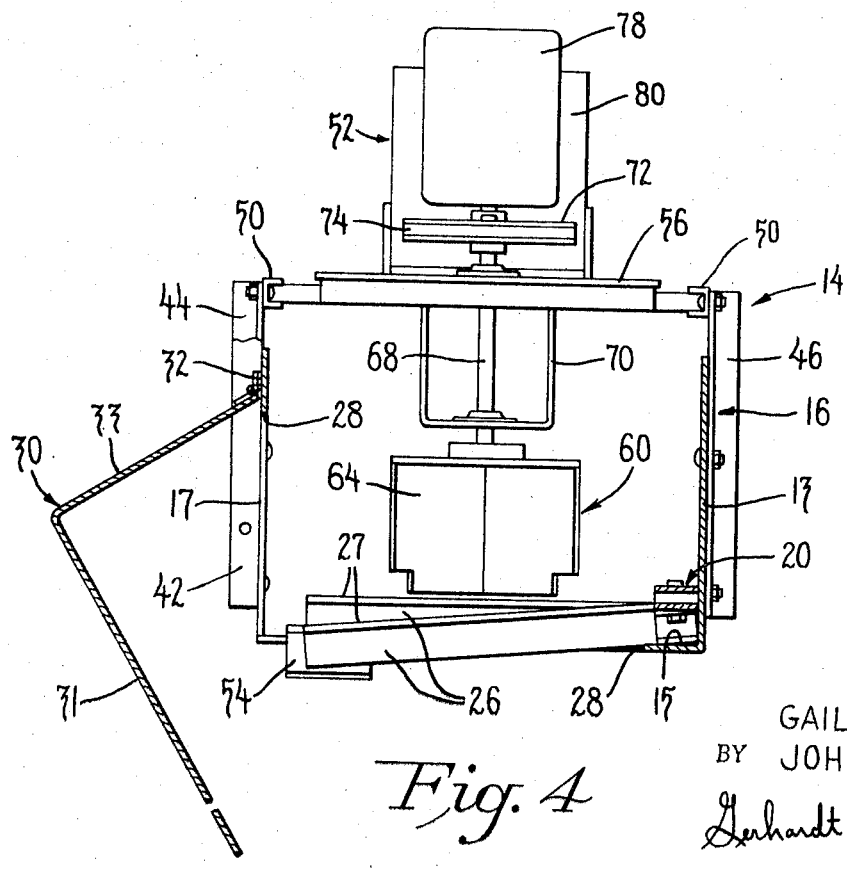
FIG. 4 is a transverse cross section through the stacking elevator as seen along line 4—4 in FIG. 3.

As more in detail illustrated in FIGS. 2 to 4, the trough-like longitudinal housing 16 retains an endless chain 20 which is trained around the upper end of the stacking elevator and is driven by a conventional driving mechanism 22 (FIG. 1). The endless conveyor chain 20 is composed of a plurality of individual link members 24 to which are attached, at spaced locations, a plurality of paddle members 26 in the form of transverse cross bars extending transversely across the bottom 15 of the trough-like housing 16. The individual-spaced paddle members 26 are of L-shaped rectangular construction having a flat top surface 27 as particularly seen in FIGS. 3 to 6 for a purpose to appear.

The longitudinal trough-like housing 16 of the elevator 14 provides a pair of opposite side walls 13 and 17 extending upwardly from the bottom 15. At one location, along the elevator 14, an opening 28 is provided in the bottom 15 of longitudinal housing 16 which projects upwardly into the side wall 17 of the housing. As further shown in detail in FIGS. 2 and 4, the opening 28 normally is adapted to be closed by a closure member or cover 30 which is hinged at 32 to the outside of side wall 17 just above the upper end of opening 28. Normally, when the present improved unit is not in use, as shown in FIG. 2, cover 30 is adapted to seal opening 28 to provide a continuous formation of longitudinal housing 16. The cover 30 is retained in closed position by means of a removable rod member 34 extending across the underside of the cover 30 for releasable insertion through a pair of opposite bracket members 36 attached to the bottom of housing 16 adjacent both ends of opening 28. The side portion of cover 30 is moved into tight sealing engagement against side wall 17 by means of a cam type rotatable rod member 38 provided with a handle 40. Cam type rod member 38 is supported for rotation within aligned apertures of a pair of upwardly extending side brackets 42 and 44 respectively which are attached to side wall 17 adjacent the lateral portion of opening 28 in side wall 17. As is known, cam rod 38 has a longitudinal cam surface which is adapted for camming engagement against the outside of the side portion of cover 30 when rod 38 is rotated to the closing position.

It will be noted from the drawings, particularly FIG. 4, that cover member 30 is composed of two portions, 31 and 33, which are angularly off-set from each other in conformity with the shape of opening 28 which extends substantially across the entire width of bottom 15 and upwardly into adjoining side wall 17. The bottom portion 31 of cover member 30 is substantially larger than the adjoining side portion 33 so that, when the locking bars 34, 38 are moved, the cover member 30 will be caused to swing away from opening 28 around its hinges 32 into an angularly inclined position relative to the longitudinal axis of housing 16, as seen in FIG. 4.

Longitudinal housing 16, at the location of opening 28, is further provided with a pair of oppositely aligned side brackets 46 and 48 respectively which are secured to the opposite wall 13 in alignment with brackets 42, 44. The upper ends of side brackets 42–48 extend above the edge of side walls 13 and 17 for attachment to a frame member 50 extending across the top of housing 16 over the opening 28. Frame member 50 is of open rectangular configuration to permit selective disposal of wiper unit 52 through the frame and into the trough-like housing 16 between side walls 13, 17 and across opening 28.

As will be seen from FIG. 3 in the drawings, one side of opening 28 is provided with an inclined flange portion 54 caused to pivot downwardly upon opening of cover member 30 to provide a guiding means for the individual paddle members 26 as they are moved across opening 28, as will be explained.

Since the longitudinal paddle members 26 are secured only at one end to the chain 20, the free ends of the paddle members 26 drop slightly downwardly as they pass over the opening 28 as illustrated in FIGS. 3 and 4. The inclined flange 54 at the far end of the opening 28 permits the paddle members 26 to be guided back onto the bottom 15 of housing 16 without interference or danger of becoming lodged within the opening. Thus, a continuous smooth operation of the conveyor chain across opening 28 is assured.

The present improved wiper unit 52 is supported on a plate member 56 which is adapted to be rotated into position over the rectangular frame 50 by means of a pivot shaft 58 connected between opposite side brackets 42 and 46 for transverse extension across the top of housing 16 as shown.

Plate member 56 rotatably supports a wiper blade assembly 60 extending from the underside of the plate member. The wiper blade assembly 60 comprises a rotor member 62 which supports a plurality of rotor blades 64. Rotor blades 64 as shown are of rectangular configuration and each is provided at its lower outer edge with a recess 66 for a purpose to be described. The rotor member 62 is supported on a shaft 68 which extends through a bearing assembly 70 upwardly through the rotor member 62. The upper end of rotor shaft 68 at the other side of plate 56 is attached to a driving member such as a pulley or the like 72. Pulley 72 is drivingly connected by means of a drive belt or the like 74 to the driven member 76 of a motor 78. Motor 78 is stationarily secured to a support 80 which is attached to plate 56 at the pivot end thereof. Thus, upon activation of motor 78 for rotation of driven member 76, rotor member 62 will be rotated in a corresponding direction as determined by the direction of movement of conveyor chain 20.

When the wiper unit 52 is not in use, the entire unit is swung upwardly around pivot 58 outwardly of trough-like housing 16. This position is shown in FIG. 2. Wiper unit 52 is stationarily secured in an outwardly tilted position by means of a releasable lock bar 82 adapted for insertion through aligned apertures provided in the top of frame member 50.

In the event wiper unit 52 is intended to be used for dispersion of material through opening 28, the retaining bar 82 is removed from the top of frame 50 after which the unit 52 can be swung into active position downwardly upon frame 50, permitting the rotor member 62 and blade 64 to extend into housing 16 between side walls 13, 17. This position is shown in FIGS. 3 to 6.

Figure 5:
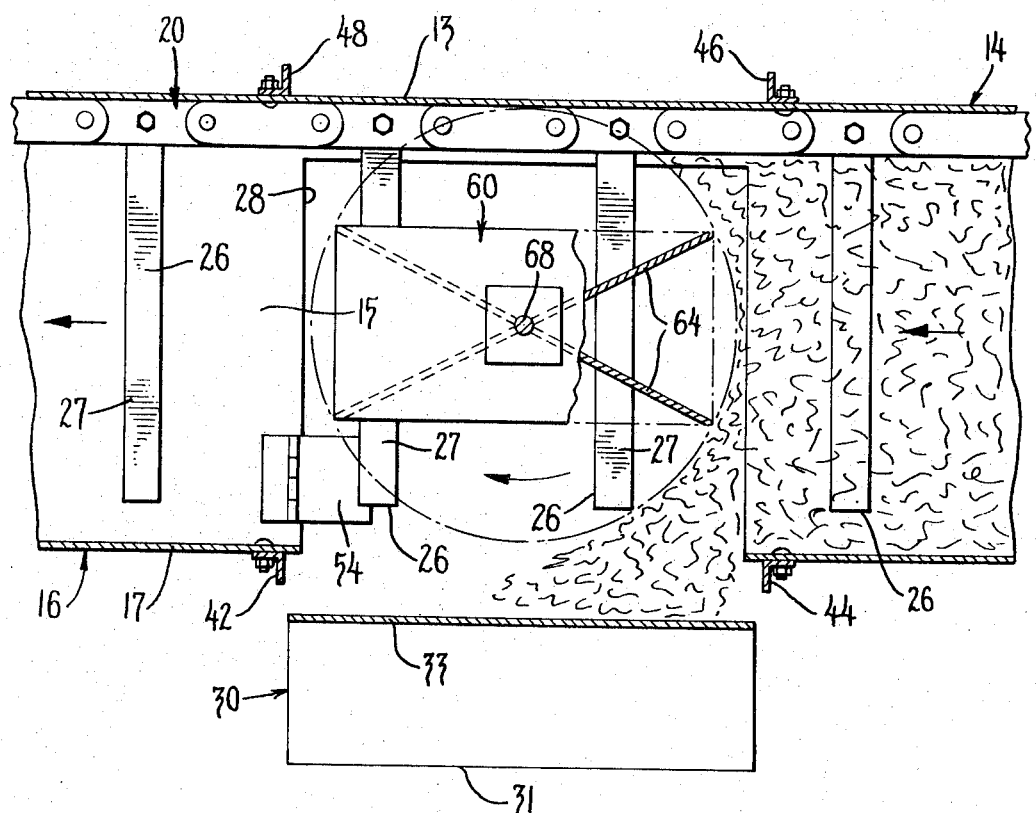
FIG. 5 is a fragmentary top plan view of the stacking elevator and improved drop-out chute arrangement illustrating the operation of the mechanism.
Figure 6:
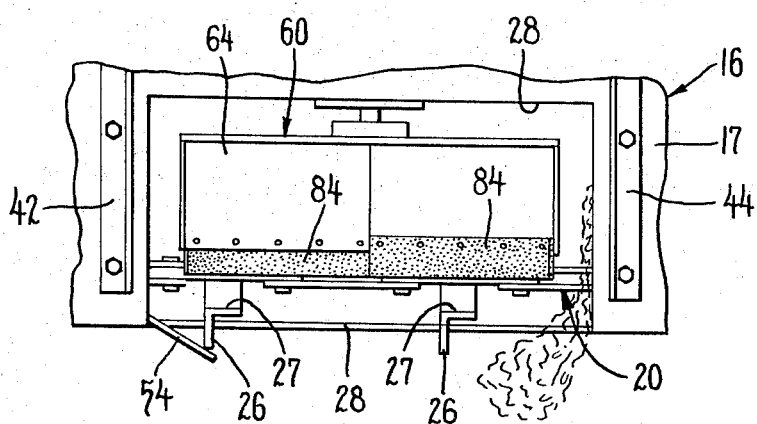
FIG. 6 is a fragmentary side view of the illustration shown in FIG. 5.

The rotor blades 64 are made of any suitable wear resistant material such as steel, hard rubber or the like. In the instance that metal blades are used, the bottom edges of the blades 64 can be provided with interchangeable rubber attachments 84 (FIG. 6) for more efficient flexible wiping action across the paddle members 26 when they are disposed over the opening 28. The lower edge recesses 66 in each of the rotor blades 64 are provided to permit clearance over the conveyor chain 20 during rotation as illustrated in FIGS. 5 and 6 while at the same time eliminating interference with other paddle members adjacent opening 28 positioned in the flat bottom 15 of the trough-like housing 16 at a slightly higher position than the respective paddle members 26 positioned directly over opening 28 and which are slightly deflected downwardly through the opening as shown in FIGS. 3 and 4. The relative vertical operating position of the rotor blades 64 in relation to the upper surface of paddle members 26 can be selectively adjusted along the rotor shaft 68 by longitudinal adjustment of rotor shaft 68 within the bearing assembly 70 to obtain maximum wiping efficiency and to accommodate different paddle heights.

In operation of the present device, material such as cow manure or the like is intended to be conveyed upwardly along the stacking elevator 14 in the direction of travel as indicated by the arrows in FIG. 5. The material is retained in the trough-like housing 16 and moved by the individual transverse paddle members 26 which are attached to a chain 20 upwardly along the stacking elevator towards the intermediate opening 28.

The cover member 30 has been released previously to swing into open position away from opening 28 and the wiper unit 52 is in the operating position as illustrated in FIGS. 3 to 6.

It will be understood that a receiving unit, such as a spreader vehicle 11 or the like (as shown in FIG. 1), has been disposed under the stacking elevator directly underneath opening 28 to receive the material ejected through the opening.

As the material approaches the opening 28, some of the material merely drops through the opening downwardly. A large portion of the material, however, will be retained on the transverse paddle members 26 and, in many instances, due to the particular shape of the material, is twisted around the paddle members 26 and thus has to be wiped off from the paddle members.

Upon moving of the chain 20, the paddle members 26 are successively disposed over the opening 28 at which position they are slightly dropped downwardly, as illustrated in FIGS. 3, 4 and 6. The wiper unit 52 is actuated for rotation of the rotor member 62 to rotate the blades 64 across the number of paddle members 26 which, at any one time, happen to be disposed across opening 28, as illustrated in FIG. 5. The rotating action of blades 64 across the top surface of paddle members 26 effectively wipes all material off the paddle members for ejection through the bottom and through the side portion of the opening 28 as also illustrated in FIGS. 5 and 6. The outwardly swung cover member 30, in the operating position of the device as shown in FIGS. 4 and 5 provides an effective baffle member for the material ejected through the side portion of opening 28 to guide the material downwardly onto the receiving vehicle.

It will be evident from the foregoing disclosure in connection with the attached drawings that the present invention provides an improved wiping arrangement for the material conveyed by paddle members of a stacking elevator to effectively wipe the material off the paddle members for ejection through an intermediate drop-out chute for direct leading onto a spreader vehicle or the like.

Conveniently, the improved device can be swung out of the way when not in use and a closure member is provided for sealing closure of the intermediate drop-out chute to selectively permit continuous operation of the stacking elevator for conveyance of material to the end of the stacking elevator and subsequent storage in a stacking pile.

Although the present invention has been described by way of a preferred embodiment, it is obvious that various modifications in detail and structural arrangement may be made without departing from the spirit and essential characteristic of the invention as defined by the appended claims.

What we claim is:

1. In combination with a barn cleaner comprising a conveyor means and a stacking elevator including a chain and slat type conveyor adapted to convey material from a ground pick-up station to a stacking station, the improvement characterized by means selectively operable to re-direct material from the stacking elevator prior to reaching the discharge end at a point intermediate the ground pick-up station and the stacking station; said means comprising a drop chute positioned along the path of said stacking elevator; rotatable wiping means pivotally disposed above the drop chute and selectively movable between an inactive position away from said chute and an active position above said chute for releasing material conveyed along said conveyor means and stacking elevator at a point intermediate the ground pick-up station and the stacking station; said wiping means including a bladed member rotatable around an axis normal to the plane of said stacking elevator, when in the active operating position, that is operable to wipe material off said stacking elevator and through said drop chute to prevent accumulation of material on said conveyor means and stacking elevator; said bladed member normally being disposed in an out-of-the-way position remote from the path of said stacking elevator to permit continuous uninterrupted conveyance of material along said conveying means and said stacking elevator when said wiping means is not in use.

2. The combination as defined in claim 1, further characterized by said bladed member of said wiping means comprising a rotor member having a plurality of blades mounted thereon around an axis of rotation; each of said plurality of blades comprising a flat surface disposed in a plane normal to the direction of travel of said stacking elevator, each of the blades having a lower wiping edge adapted for rotary movement across the path of said stacking elevator.

3. The combination as defined in claim 2, characterized by said stacking elevator having an endless chain; means driving said chain; a plurality of transverse positioned longitudinally spaced paddle members, each of said paddle members having one end connected to said chain for movement therewith, said paddle members being adapted upon movement of said chain to move material from the ground pick-up station upwardly along said stacking elevator and across said opening; said lower wiping edges of said rotor blades being spaced such from the upper surface of said paddle members to effectively wipe material from said surface.

4. The combination as defined in claim 1, characterized by said stacking elevator comprising a longitudinal trough-like member having a bottom and opposite side walls extending therefrom; said drop chute comprising an opening intermediate the ends of said stacking elevator within the bottom and a portion of one of said side walls; a releasable closure member hingeably attached to the outside of said one side wall adapted to normally cover said opening when said wiping means is not in operation so as to provide a continuous bottom and side surface across said opening for uninterrupted conveyance of material therealong.

5. The combination as defined in claim 4, characterized in that said closure member comprises a plate having portions extending at an angle to each other, one of said portions adapted for closure of the bottom portion of said opening and the other of said portions adapted for closure of the side portion of said opening; releasable locking means to normally retain said closure member in closed position; said closure member, when released into open position, being adapted to swing away from said opening into an angularly disposed downwardly directed position whereby said closure member provides a baffle surface for material ejected through said opening by said wiping means.

* * * * *